United States Patent
Tiruvuru

(10) Patent No.: US 9,582,123 B2
(45) Date of Patent: Feb. 28, 2017

(54) DUAL-MODE CAPACITANCE SENSING IN A TOUCH PANEL SENSOR

(71) Applicant: QUALCOMM Incorporated, San Diego, CA (US)

(72) Inventor: Rajesh Tiruvuru, Andhra Pradesh (IN)

(73) Assignee: QUALCOMM Incorporated, San Diego, CA (US)

( * ) Notice: Subject to any disclaimer, the term of this patent is extended or adjusted under 35 U.S.C. 154(b) by 214 days.

(21) Appl. No.: 13/684,702

(22) Filed: Nov. 26, 2012

(65) Prior Publication Data
US 2014/0145997 A1    May 29, 2014

(51) Int. Cl.
G06F 3/044    (2006.01)
G06F 3/041    (2006.01)

(52) U.S. Cl.
CPC ............ *G06F 3/044* (2013.01); *G06F 3/0416* (2013.01); *G06F 2203/04106* (2013.01)

(58) Field of Classification Search
CPC .......... G06F 3/044; G06F 3/041; G06F 3/045; G06F 2203/04106
See application file for complete search history.

(56) References Cited

U.S. PATENT DOCUMENTS

| | | | | |
|---|---|---|---|---|
| 2008/0157867 A1* | 7/2008 | Krah | | 329/304 |
| 2010/0321336 A1* | 12/2010 | Chou et al. | | 345/174 |
| 2012/0043971 A1 | 2/2012 | Maharyta | | |
| 2013/0285972 A1* | 10/2013 | Elias et al. | | 345/174 |
| 2013/0314109 A1* | 11/2013 | Kremin | | G01R 27/2605 324/686 |

* cited by examiner

*Primary Examiner* — William Boddie
*Assistant Examiner* — Bryan Earles
(74) *Attorney, Agent, or Firm* — Weaver Austin Villeneuve & Sampson LLP

(57) ABSTRACT

A touch panel sensor system configured to measure mutual-capacitance and self-capacitance is disclosed. The touch panel sensor system includes a sensor configured to detect a change in capacitance associated with a touch event upon a touch panel and a measuring component. The measuring component is configured to detect mutual-capacitance during the first mode of operation and to detect self-capacitance during the second mode of operation. The system also includes a selection component that is configured to receive a selection signal to cause selection of the mode of operation. The system also includes a driver component coupled to the selection component and configured to generate a drive signal, which is furnished to the sensor during the first mode of operation and furnished to the measuring module during the second mode of operation. The amplitude characteristic of the drive signal may have differing values for the first and second modes of operation.

19 Claims, 4 Drawing Sheets

DUAL-MODE CAPACITANCE SENSING IN A TOUCH PANEL SENSOR

BACKGROUND

A touch panel is a human machine interface (HMI) that allows an operator of an electronic device to provide input to the device using an instrument such as a finger, a stylus, and so forth. For example, the operator may use his or her finger to manipulate images on an electronic display, such as a display attached to a mobile computing device, a personal computer (PC), or a terminal connected to a network. In some cases, the operator may use two or more fingers simultaneously to provide unique commands, such as a zoom command, executed by moving two fingers away from one another; a shrink command, executed by moving two fingers toward one another; and so forth.

A touch screen is an electronic visual display that incorporates a touch panel overlying a display to detect the presence and/or location of a touch within the display area of the screen. Touch screens are common in devices such as all-in-one computers, tablet computers, satellite navigation devices, gaming devices, media devices, and smartphones. A touch screen enables an operator to interact directly with information that is displayed by the display underlying the touch panel, rather than indirectly with a pointer controlled by a mouse or touchpad. Capacitive touch panels are often used with touch screen devices. A capacitive touch panel generally includes an insulator, such as glass, coated with a transparent conductor, such as indium tin oxide (ITO). As the human body is also an electrical conductor, touching the surface of the panel results in a distortion of the panel's electrostatic field, measurable as a change in capacitance.

SUMMARY

A touch panel sensor system configured to provide mutual-capacitance sensing capabilities during a first mode of operation and self-capacitance sensing capabilities during a second mode of operation is disclosed. The touch panel sensor system includes a sensor configured to detect a change in capacitance associated with a touch event upon a touch panel. The system includes a measuring component coupled to the sensor. The measuring component is configured to detect mutual-capacitance during the first mode of operation and to detect self-capacitance during the second mode of operation. The system also includes a selection component coupled to the sensor and to the measuring component. The selection component is configured to receive a selection signal to cause selection of either the first mode of operation or the second mode of operation. The system also includes a driver component coupled to the selection component and configured to generate a drive signal. The drive signal is furnished to the sensor during the first mode of operation and furnished to the measuring module during the second mode of operation. The amplitude characteristic of the drive signal may have differing values for the first mode of operation and the second of operation. For example, the amplitude characteristic of the drive signal during the second mode of operation (e.g., self-capacitance sensing) may be at least approximately ten times smaller than the amplitude characteristic of the drive signal during the first mode of operation (e.g., mutual capacitance sensing).

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. The use of the same reference numbers in different instances in the description and the figures may indicate similar or identical items.

DETAILED DESCRIPTION

Overview

Figure 1A:
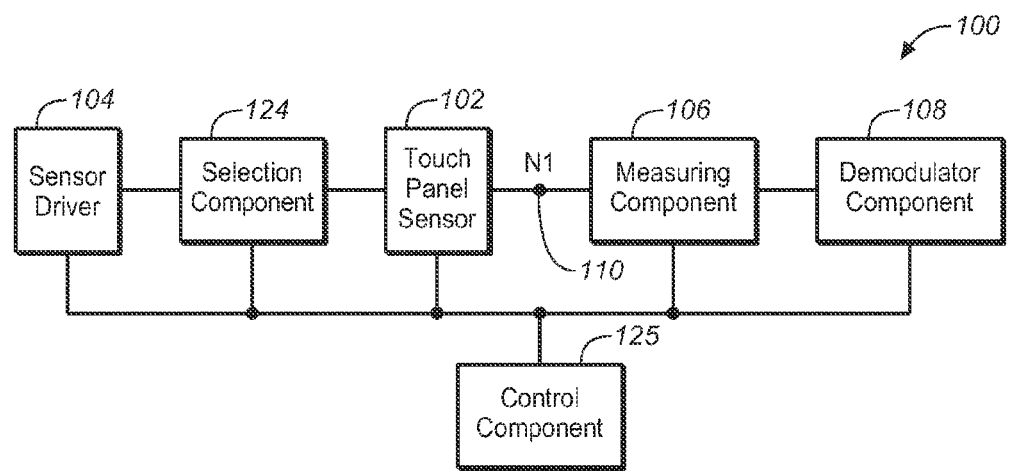
FIG. 1A is a block diagram illustrating a touch panel sensor system in accordance with an example implementation of the present disclosure.

Capacitive touch panels detect capacitance changes caused by a user touching the screen (e.g., change in mutual capacitance within a touch sensor), the sensor capacitance of the touch sensor, and other environmental (e.g., parasitic) capacitances. These sensor and parasitic capacitances can change from sensor to sensor and from touch panel to touch panel. Additionally, touch sensor configurations do not provide for self-capacitance sensing capabilities.

In one or more implementations, the touch event capacitance ($C_A$) is about ten percent to fifteen percent (10% to 15%) of the sensor capacitance ($C_s$) (e.g. $C_A$=1 pico-Farad and $C_s$=10 pico-Farads). Thus, the charge transfer schemes/integrators used to measure the touch panel capacitance typically must be able to accommodate a greater amount of capacitance that represents the touch event capacitance in addition to the sensor capacitance and the parasitic capacitances (e.g., $C_A+C_s$+parasitic capacitance). This larger capacitance may prevent the use of larger gain circuits designed to generate improved signal to noise ratios as well as requiring inefficient use of analog to digital converter (ADC) range. Some charge transfer schemes/integrators may include an integrating capacitor that is sufficiently large so as to not be saturated by the total capacitance/charge received from the sensors. However, using large integrating capacitors increases the cost and the size of components, as well as reducing the gain and the resolution of the measurement system.

Accordingly, a touch panel sensor system is described to provide for mutual-capacitance sensing capabilities during a first mode of operation and self-capacitance sensing capabilities during a second mode of operation. Additionally, the touch panel sensor system may include components (e.g., circuitry) to minimize environmental (e.g., parasitic) and sensor capacitances, which may improve the dynamic range of the touch panel sensor system. In one or more implementations, the touch panel sensor system includes a sensor configured to detect a change in capacitance associated with a touch event upon a touch panel. The system also includes a measuring component coupled (e.g., electrically connected) to the sensor. The measuring component is configured to detect mutual-capacitance associated with the sensor during a first mode of operation and to detect self-capacitance associated with the sensor during a second mode of operation. In an implementation, the measuring component comprises multiple integrators. Each integrator is coupled to a corresponding sensing line and/or driving line of the sensor. The system also includes a selection component coupled to the sensor and to the measuring component. The selection component is configured to receive a selection signal to cause selection of at least the first mode of operation or the second mode of operation. The system also includes a driver component coupled to the selection component. The driver component is configured to generate a drive signal, and the drive signal is furnished to the sensor during the first mode of operation and furnished to the measuring module during the second mode of operation.

Example Implementations

FIG. 1A illustrates a touch panel sensor system 100 in accordance with an example implementation of the present disclosure. The touch panel sensor system 100 includes a touch panel sensor 102, a sensor driver component (e.g., sensor driver 104), a measuring component 106, and a demodulator component 108. In implementations, the touch panel sensor system 100 may include a greater number or a lesser number of the above components in accordance with the requirements of the system 100 (e.g., space restraints, functionality requirements, and so forth). The touch panel sensor system 100 may also include additional components, such as multiplexers, controllers, or the like, as described in greater detail herein. In some implementations, the sensor driver 104, the measuring component 106, and the demodulator component 108 may be fabricated onto a single integrated circuit chip (IC) device (e.g., each component is fabricated on a single die). In other implementations, one or more of the components described above may be external to the IC (e.g., fabricated on another IC device).

The sensor driver 104 is coupled (e.g., electrically connected) to one or more sensors of the touch panel sensor 102 so that the sensor driver 104 outputs a drive signal having waveform characteristics that drives the coupled sensors. In a specific implementation, the sensor driver 104 may be a digital to analog converter (DAC). However, in some implementation, the sensor driver 104 may comprise other suitable devices capable of producing driving signals.

The touch panel sensor 102 is coupled to the output of the sensor driver 104 and the input of the measuring component 106. The sensor 102 is utilized to detect a touch event over a surface of a touch panel. For example, the touch panel sensor 102 can include a capacitive sensing medium having a plurality of row traces (e.g., electrodes) or driving lines and a plurality of column traces or sensing lines for detecting a change in capacitance due to a touch event performed over a surface of the touch panel. The row and the column traces can be formed from a transparent conductive material, such as Tin Oxide (ITO) or Antimony Tin Oxide (ATO), although other transparent and non-transparent materials such as copper may be used. In some implementations, the row and the column traces can be perpendicular to each other such that the row and column traces define a coordinate system and each coordinate location comprises a capacitor formed at the intersection of the row and column traces. In other implementations, other non-Cartesian orientations are also possible.

As a result, when the sensor driver 104 generates a signal having waveform characteristics that drives one or more of the sensors on the touch panel sensor 102, the charge from the sensors is transferred to the input of the measuring component 106 at the node (N1) 110. The output of the measuring component 106 is coupled to the input of the demodulator component 108. The capacitance charge measured at the node (N1) 110 may be represented as an analog voltage value that is furnished to the demodulator component 108. In one or more implementations, the measuring component 106 may comprise a plurality of integrator devices 112. As shown, each integrator device 112 is coupled to a corresponding driving line and/or a corresponding sensing line. As shown, the integrator devices 112 comprise a charge amplifier 114 having an integrating capacitor ($C_{int}$) 116 electrically connected across an inverting terminal 118 and an output terminal 120 of the charge amplifier 114. The charge amplifier 114 also includes a non-inverting terminal 122, which is described in greater detail herein. The charge amplifier 114 is configured to transfer the input charge (e.g., charge from the sensor 102) to the integrating capacitor 116 and to generate an output voltage at the output 120 at least approximately equal to the voltage across the capacitor 116. Thus, the output voltage is proportional to the charge at the integrating capacitor 116 and, respectively, to the input charge. However, in another implementation, the measuring component 106 may comprise any device (e.g., circuitry) capable of receiving a capacitance and outputting a voltage that corresponds to the capacitance.

The output 120 of the charge amplifier 114 is electrically connected to demodulator component 108. In one or more implementations, the demodulator component 108 comprises an analog-to-digital converter (ADC). The output of the demodulator component 108 outputs from the system 100 to a device that may be controlled by the touch panel sensor system 100.

Figure 1C:
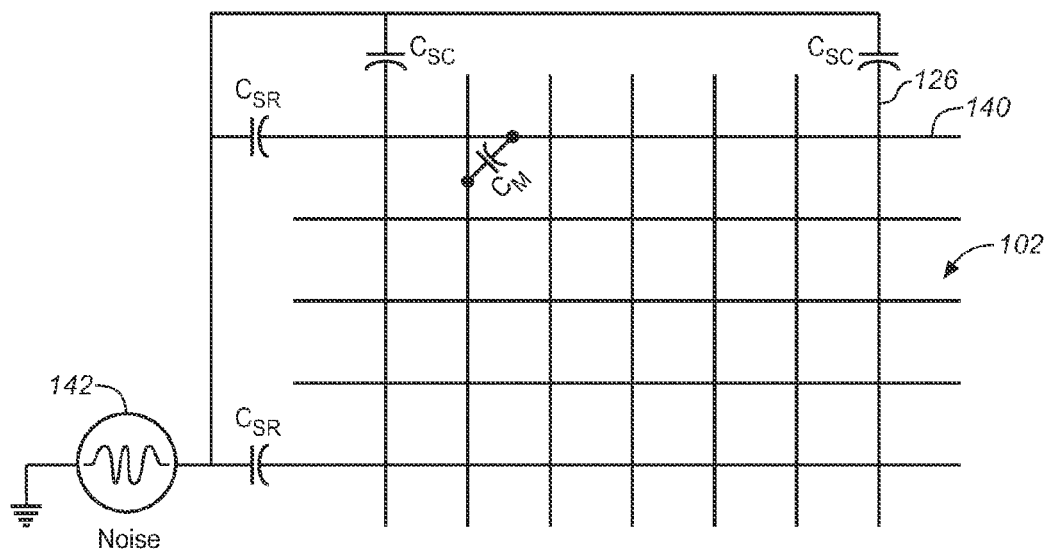
FIG. 1C is a diagrammatic circuit diagram illustrating possible types of capacitances present within the touch panel sensor system of the present disclosure
Figure 1B:
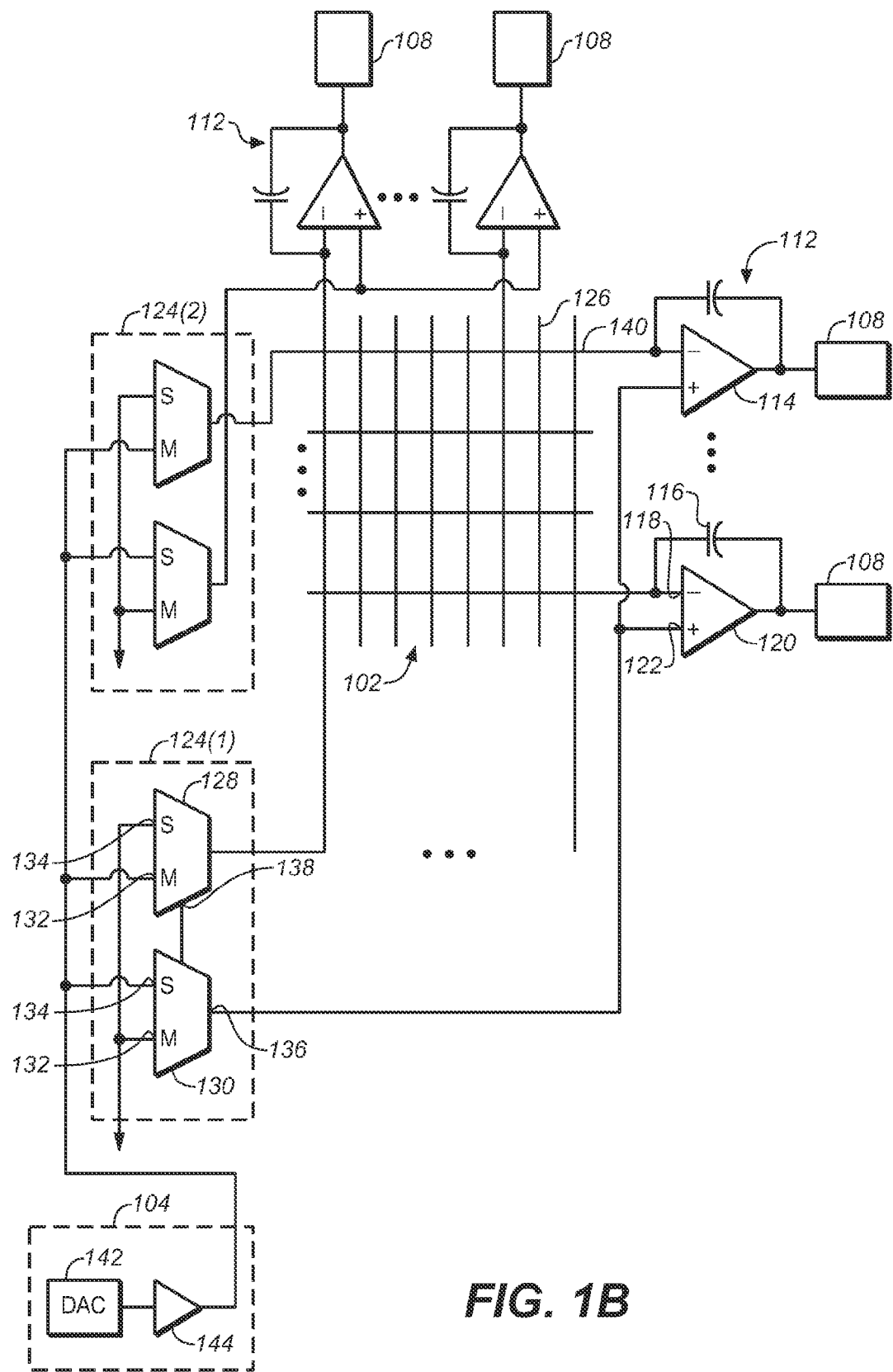
FIG. 1B is a circuit diagram illustrating the touch panel sensor system shown in FIG. 1A.

As shown in FIGS. 1A and 1B, the system 100 also includes one or more selection components 124. The selection component 124(1) is electrically connected to one or more columns 126 of the sensor 102 and to the non-inverting terminal 122 of the charge amplifier 114. In one or more implementations, selection components 124 comprise a plurality of a multiplexers 128, 130 and each multiplexer 128, 130 includes a first input terminal 132, a second input terminal 134, and an output terminal 136. As shown, the first input terminal 132 of the multiplexer 128 and the second input terminal 134 of the multiplexer 130 is electrically connected to the sensor driver 104; and the second input terminal 134 of the multiplexer 128 and the first input terminal 132 of the multiplexer 130 is connected to ground potential. The output terminal 136 of the multiplexer 128 is electrically connected to the columns 126 of the sensor 102, and the output terminal of the multiplexer 130 is electrically connected to the non-inverting terminal 122 of the charge amplifier 114. Each multiplexer 128, 130 also includes a selection terminal 138 that is configured to furnish a selection signal to cause the multiplexers to select between outputting the signal at the first input terminal 132 or the signal at the second input terminal 134.

FIG. 1C illustrates representations of potential capacitances within the system 100. The mutual capacitance ($C_M$) is capacitance that occurs between two charge-holding objects (e.g., conductors). In this instance, the mutual capacitance is the capacitance between the columns 126 and the rows 140 that comprise the sensor 102. As described above, the columns 126 and the rows comprise traces that represent the driving lines and corresponding sensing lines to detect a change in mutual capacitance due to a touch event performed over the surface of the touch panel. It is understood that the columns 126 may represent the driving lines and the rows 140 represent the sensing lines in some implementations, and the columns 126 may represent the sensing lines and the rows 140 represent the driving lines in other implementations. The self-capacitance is the capacitance associated with the respective column 126 ($C_{SC}$) and the respective row 140 ($C_{SR}$), which represents the amount of electrical charge to be furnished to the respective column 126 or row 140 to raise its electrical potential by one unit (e.g., one volt, etc.). The noise voltage source 142 represents the noise associated with the system 100 (e.g., noise within the sensor 102, etc.).

The selection terminal 138 receives a signal representing a capacitance selection mode of operation (corresponding input terminals for mutual-capacitance sensing mode of operation are denoted "M" and corresponding input terminals for self-capacitance sensing mode of operation are denoted "S"). For example, the selection signal may cause the system 100 to transition to a mutual-capacitance sensing mode of operation. In this example, the selection signal causes the multiplexer 128 of the selection component 124(1) to output the drive signal generated by the sensor driver 104 to the columns 126 and causes the multiplexer 130 to tie the non-inverting terminal 122 of the charge amplifier 114 to ground. In another example, the selection signal may cause the system 100 to transition to a self-capacitance sensing mode of operation. In this example, the selection signal causes the multiplexer 130 to output the drive signal generated by the sensor driver 104 to the non-inverting terminal 122 of the charge amplifier 114 and causes the multiplexer 128 to tie the columns 126 to ground. In this configuration during the self-capacitance sensing mode of operation, the measuring component 106 is configured to measure the self-capacitance of the corresponding row 140.

As shown in FIG. 1B, another selection component 124(2) is coupled to the rows 140. Thus, the selection terminal 138 receives a signal representing a capacitance selection mode of operation. For example, the selection signal may cause the system 100 to transition to a mutual-capacitance sensing mode of operation. In this example, the selection signal causes the multiplexer 128 of the selection component 124(2) to output the drive signal generated by the sensor driver 104 to the rows 140 and causes the multiplexer 130 to tie the non-inverting terminal 122 of the charge amplifier 114 to ground. In another example, the selection signal may cause the system 100 to transition to a self-capacitance sensing mode of operation. In this example, the selection signal causes the multiplexer 130 to output the drive signal generated by the sensor driver 104 to the non-inverting terminal 122 of the charge amplifier 114 and causes the multiplexer 128 to tie the corresponding row 140 to ground. In this configuration during the self-capacitance sensing mode of operation, the measuring component 106 is configured to measure the self-capacitance of the corresponding column 126. It is contemplated that the second selection component 124(2) and corresponding measuring components 106 (e.g., integrators 112 connected to the columns 126 of the sensor 102) may not be utilized while sensing the mutual-capacitance (first mode of operation). Additionally, for sensing the self-capacitance of the columns 126, the first selection component 124(1) and corresponding measuring components 106 may be re-utilized during the second mode of operation. It is understood that the self-capacitance of the columns 126 and the rows 140 may not be sensed at substantially the same time. For example, while the self-capacitance of the rows 140 are being measured (e.g., determined), the columns 126 are grounded through the respective multiplexers 128, and vice versa.

Figure 2:
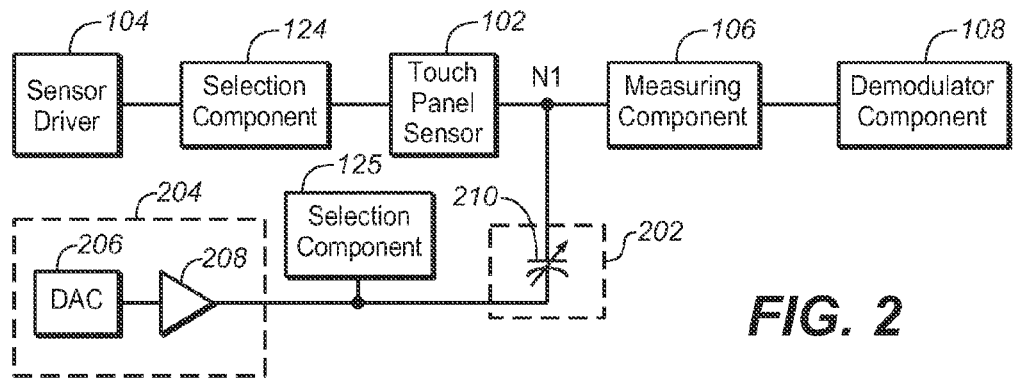
FIG. 2 is a circuit diagram illustrating a touch panel sensor system in accordance with another example implementation of the present disclosure, where the touch panel sensor system further includes an offset cancellation component.

In an implementation, as shown in FIG. 2, the system 100 may further include an offset cancellation module 202 and an offset cancellation driver component (e.g., offset cancellation driver 204). The offset cancellation driver 204 is coupled to the offset cancellation component 202 and generates an offset cancellation signal having waveform characteristics that drive the offset cancellation component 202. As illustrated, the offset cancellation driver 204 is a DAC. However, in implementations, the offset cancellation driver 204 may comprise a suitable device capable of generating driving signals. Moreover, one or more components of the sensor driver 104 may be shared by the offset cancellation driver 204. The offset cancellation component 202 is coupled to the output of the offset cancellation driver 204 and the input of the measuring component 106. As a result, when the offset cancellation driver 204 outputs an offset cancellation signal that drives the offset cancellation module 202, the charge from the offset cancellation module 202 is transferred to the input of the measuring component 106 at node (N1) 110. Thus, the charge output from the sensors (e.g., sensor driver 104 and touch panel sensor 102) and the charge output from the offset cancellation component 202 are combined at the node (N1) 110 and input to the measuring component 106. The charge output from the offset cancellation component 202 may be utilized to at least substantially cancel parasitic capacitance and/or sensor 102 capacitance at the node (N1) 110 such that the measuring module 106 measures at least substantially the change in capacitance due to a touch event.

In an implementation, a control component 125 (e.g., control logic circuitry) may be coupled to the touch panel sensor 102, the sensor driver 104, the demodulator component 108, the measuring component 106, and the offset cancellation component 202 so that the control logic may control the operation of the system 100. For example, as described herein, the control component 125 is configured to control various aspects of the selection component 124, the offset cancellation driver 204, the offset cancellation component 202, and so forth. In another implementation, the system 100 may be configured as an open loop system. In an implementation, the control module 124 is configured to cause issuance of a selection signal to the selection components 124, which results in either the self-capacitance measurement mode of operation or the mutual-capacitance measurement mode of operation.

As described above, FIG. 1B illustrates a specific implementation of the touch panel sensor system 100 shown in FIG. 1A. In FIG. 1B, the sensor driver 104 comprises a sensor DAC 144 coupled to a buffer 146. The buffer 146 is configured to buffer the signal generated by the sensor DAC 144 and outputs the buffered drive signal to the sensor 102 (e.g., drive the driving lines of the sensor 102). In implementations, the sensor DAC 144 may generate a signal having waveform characteristics represented by the equation:

$$A1 \cdot \sin(\omega t), \quad \text{EQN. 1}$$

where A1 represents the amplitude of the signal, ω represents the angular frequency of the signal, and t represents time. However, in other implementations, the sensor DAC 144 may be configured to output other signals having other waveform characteristics, such as signals having square waveform characteristics, and so forth.

In one or more implementations, as shown in FIG. 2, the offset cancellation driver 204 comprises an offset cancellation DAC 206 coupled to a buffer 208, wherein the buffer 208 buffers the offset cancellation signal produced by the offset cancellation DAC 206 and outputs the offset cancellation signal to the offset cancellation capacitor ($C_{off}$) 210, of the offset cancellation component 202 in order to drive the offset cancellation capacitor ($C_{off}$) 210. In embodiments, the offset cancellation DAC 206 is configured to generate a signal having waveform characteristics that can be represented by the following equation:

$$A2 \cdot \sin(\omega t + \phi), \quad \text{EQN. 2}$$

where (A2) represents the amplitude of the signal, ω represents the angular frequency of the signal, t represents the time, and φ represents the phase of the signal. In another implementation, the offset cancellation DAC 206 may be configured to output signals having other waveform characteristics (e.g., signals having square waveform characteristics, and so forth).

The offset cancellation component 202 comprises the offset cancellation capacitor ($C_{off}$) 210, which is coupled to the output of the sensor 102 and the input of measuring component 106 at the node (N1) 110. In one or more implementations, the offset cancellation capacitor ($C_{off}$) 210 may comprise a digitally controlled variable capacitor such as a capacitive digital-to-analog converter. For example, the offset cancellation capacitor ($C_{off}$) 210 may range in capacitive values from about eight pico-Farads (8 pF) to less than one pico-Farads (<1 pF). In one or more implementations, the offset cancellation component 202 may comprise multiple capacitors and/or variable capacitors and associated circuitry so that the value of the capacitance charge/voltage output by the offset cancellation component 202 can be adjusted. However, it is contemplated that the offset cancellation component 202 may comprise other devices capable of producing adjustable capacitance. The offset cancellation capacitor ($C_{off}$) 210 and the integrating capacitor ($C_{int}$) 127 may have capacitances that are multiples of a chosen unit capacitor to form good matching between them. For example, if the chosen unit capacitor has a capacitance of two pico-Farads (2 pF), capacitor ($C_{off}$) 210 and ($C_{int}$) 127 may have values of sixty pico-Farads (60 pF) and twenty pico-Farads (20 pF), respectively. In another example, the offset capacitor ($C_{off}$) 210 and the integrating capacitor ($C_{int}$) 116 may comprise unrelated capacitive values.

The demodulator component 108 is coupled to the output of the measuring component 106 so that the voltage output by the charge amplifier 114 is converted from an analog voltage value to a digital voltage value. In a specific implementation, the demodulator component 108 comprises an analog-to-digital converter (ADC). The demodulator component 108 may also be coupled to control logic (e.g., control module 125) to sample the digital output of the demodulator component 108 and select different offset cancellation component 202 capacitances based on the sampled values. The demodulator component 108 is configured to demodulate (e.g., convert) the analog signal furnished by the measuring component 106 to a digital signal representing the analog signal.

Both the capacitance of the offset cancellation component 202 and the amplitude (A2) and/or phase (φ) of the signal output by the offset cancellation driver 204 may be adjusted to at least substantially cancel (e.g., offset) the static sensor capacitance (and any parasitic capacitance) at the node (N1) 110. This cancellation may enable the measuring component 106 to measure the change in capacitance caused by a touch event.

The ability to adjust the amplitude (A2) and phase (φ) of the offset cancellation signal allows the system 100 to at least partially cancel out the static sensor capacitance even if the offset cancellation component 202 is unable to exactly match the static capacitance value. For example, amplitude (A2) and the phase (φ) of the offset cancellation signal may be adjusted to at least substantially cancel (e.g., a majority part of) the sensor capacitance. Accordingly, the noise margin (e.g., noise headroom) of the system 100 is maximized allowing a larger gain to be used and a better signal to noise ratio to be furnished. Further, a smaller integration capacitor ($C_{int}$) 116 may be used since the integration capacitor can be configured for the values of the touch event capacitance without saturating the integrating capacitor ($C_{int}$) 116, and thereby modifying (altering) the output voltage. However, without cancellation, the integration capacitor ($C_{int}$) 116 may require a sufficiently large capacitance value to accommodate not only the value of the touch event capacitance, but also the value of the static sensor capacitance, and the parasitic capacitances together. Furthermore, the ability to utilize a smaller integration capacitor ($C_{int}$) 116 increases the resolution of the measuring component 106 because larger capacitors are unable to measure smaller charges received from the sensor 102. Moreover, improved dynamic range of the touch panel sensor system 100 is provided because both small and large capacitances can be measured by the system 100 as their capacitance offset values are at least substantially cancelled by the offset cancellation capacitor ($C_{off}$) 210.

Figure 3A:
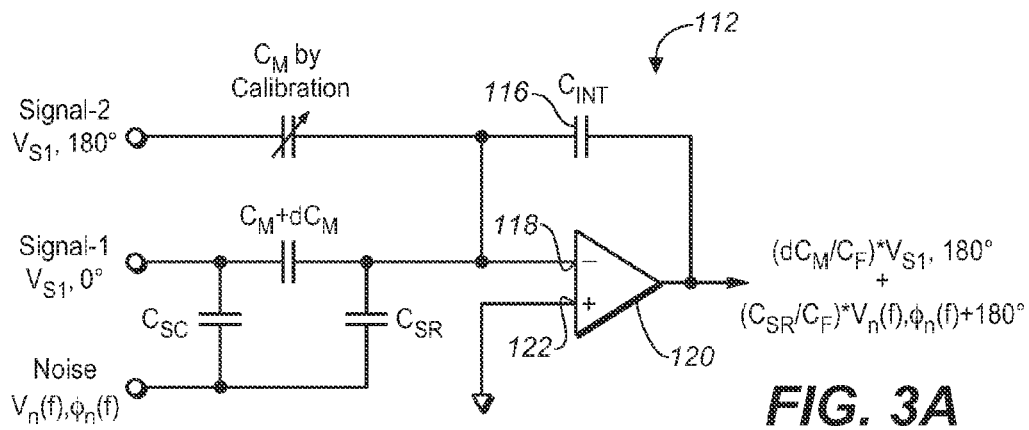
FIGS. 3A and 3B are diagrammatic circuit diagrams of a measuring component of the touch panel sensor system, where the measuring component is illustrated as outputting a signal based upon a change in mutual-capacitance in FIG. 3A and illustrated as outputting a signal based upon a change in self-capacitance in FIG. 3B.
Figure 3B:
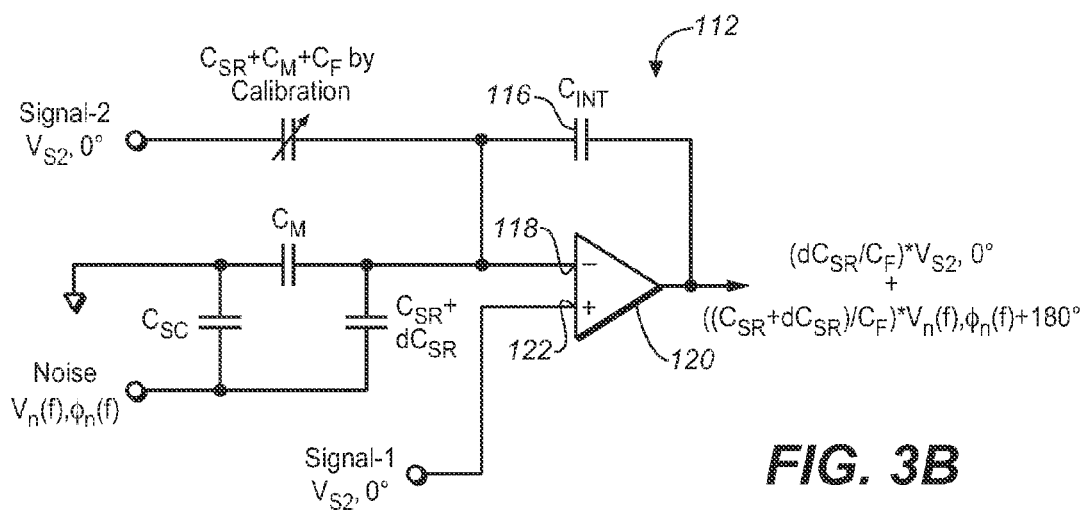

FIGS. 3A and 3B illustrate the measuring component 106 when the system 100 is measuring the mutual-capacitance and the self-capacitance within the sensor 102, respectively. Specifically, FIGS. 3A and 3B illustrate the components influencing the signals at the input of the measuring component 106 and the resultant output signal based upon the components. As shown in FIG. 3A, which represents the mutual-capacitance mode of operation, the charge present at node (N1) 110 (e.g., charge at the inverting terminal 118) is furnished from Signal 1 ($V_{S1}$) from the sensor driver 104, Signal 2 ($V_{S1}$+180°) from the offset cancellation component 202, and the noise from the sensor 102 (represented by the voltage value at a given frequency f ($V_N(f)$) and the phase of the noise value at frequency f ($\phi_N(f)$). The measured mutual capacitance can be represented by $C_M + dC_M$ (change in mutual capacitance due to touch event). As described above, the non-inverting terminal 122 is grounded during the mutual-capacitance mode of operation. Thus, the output charge value at the output terminal 120 of the charge amplifier 114 may be represented by $$(dC_M/C_{int})*V_{S1}, 180° + (C_{SR}/C_{int})*V_N(f), \phi_N(f)+180°, \quad \text{EQN. 3}$$

In EQN. 3, $V_{S1}$ and represents the amplitude of Signal 1 and 180° represents the phase value associated with the respective signal. Thus, for the mutual-capacitance sensing mode of operation, Signal 2 has a polarity at least substantially opposite of (e.g., at least approximately 180° out of phase with) Signal 1. It is understood that EQN. 3 may be modeled utilizing $C_{SC}$ in lieu of $C_{SR}$ in other configurations of the system 100. As represented in EQN. 3, the amplitude of the signal at the output terminal 120 is proportional to the touch-resulting change in the mutual-capacitance under measurement.

As shown in FIG. 3B, which represents the self-capacitance mode of operation, the charge present at the non-inverting terminal 122 is furnished from Signal 1 ($V_{S2}$) from the sensor driver 104. The charge present at the node (N1) 110 is furnished from Signal 2 ($V_{S2}$+0°) from the offset cancellation component 202 and the noise from the sensor 102 (represented by the voltage value at a given frequency f ($V_N(f)$) and the phase of the noise value at frequency $f\phi_N(f)$). The measured self-capacitance associated with a row 140 can be represented by $C_{SR}$+$dC_{SR}$ (change in self-capacitance due to touch event). It is understood that the measured self-capacitance may be associated with a column as well, which would be represented by $C_{SC}$+$dC_{SC}$. Thus, the output charge value at the output terminal 120 of the charge amplifier 114 may be represented by:

$$(dC_{SR}/C_{int})*V_{S2}, 0°+(C_{SR}/C_{int})*V_N(f), \phi_N(f)+180°, \quad \text{EQN. 4}$$

As described above, during the mutual-capacitance sensing mode of operation, Signal 2 is the opposite polarity of Signal 1. However, as represented in EQN. 4, during the self-capacitance sensing mode of operation, Signal 2 and Signal 1 have at least substantially the same polarity. Moreover, as represented in EQN. 4, the amplitude of the signal at the output terminal 120 is proportional to the touch-resulting change in the self-capacitance under measurement. In one or more implementations, the amplitude characteristics of the drive signals generated by the sensor driver 104 vary during the first mode of operation as compared to the second mode of operation. For example, the change in self-capacitance as compared to the change in mutual-capacitance resulting from a touch event is about ten times (10×). Thus, the drive signal amplitude characteristic during the first mode of operation (e.g., sensing mutual-capacitance) is at least approximately ten times greater (10×) than the drive signal amplitude characteristic during the second mode of operation (e.g., sensing self-capacitance) to allow for sensing of the self-capacitance within the system 100.

Example Methods

Figure 4:
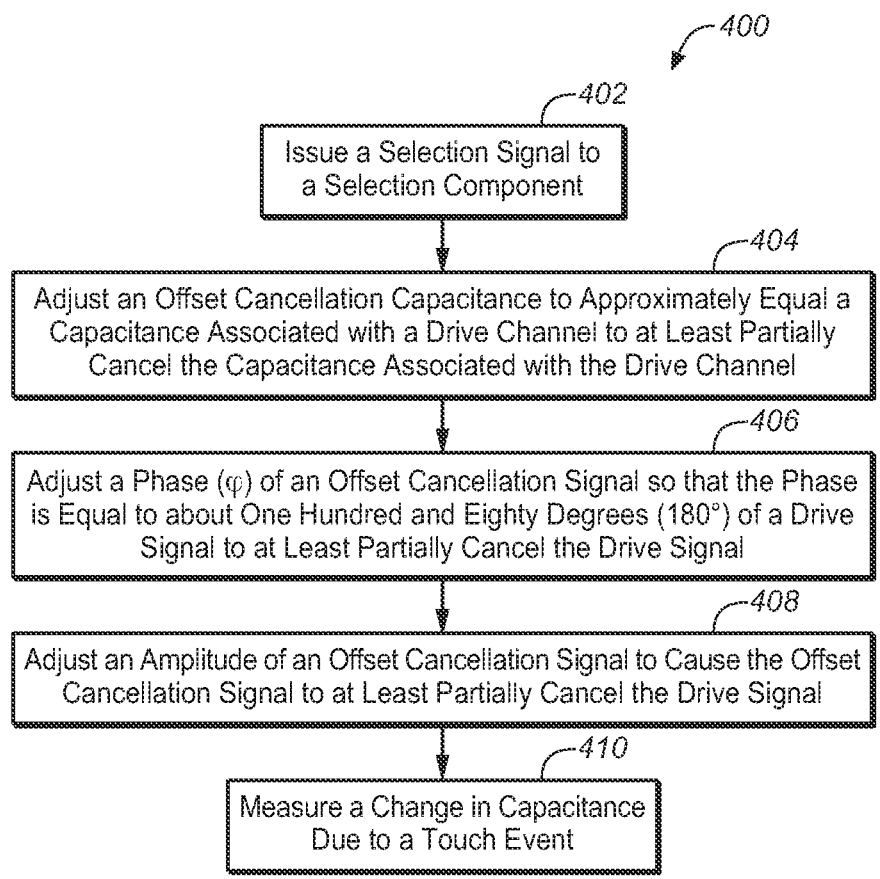
FIG. 4 is a flow diagram illustrating an example method for sensing changes in mutual-capacitance and changes in self-capacitance within a touch panel sensor system according to an example implementation of the present disclosure.

FIG. 4 illustrates a method 400 for measuring mutual-capacitance and self-capacitance within a touch panel sensor system according to an example implementation of the present disclosure. A selection signal is issued (e.g., generated and provided) to a selection component to select either a first mode of operation (e.g., mutual-capacitance sensing) or a second mode of operation (e.g., self-capacitance sensing) (Block 402). In an implementation, the control component 125 causes the generation and the issuance of a selection signal to the selection components 124 (e.g., selection components 124(1), 124(2)). Based upon the selection signal, the selection components 124 output a signal corresponding to a first mode of operation or a second mode of operation. For example, the respective multiplexers 128, 130 of each selection component 124 output a signal representing a ground signal to the non-inverting amplifier 122 of the charge amplifier 114 and output a signal representing the drive signal to sensor 102 (e.g., columns 126, rows 140) during the first mode of operation. In another example, the respective multiplexers 128, 130 of each selection component 124 output a signal representing a ground signal to the sensor 102 (e.g., columns 126, rows 140) and output a drive signal to the non-inverting terminal 122 of the charge amplifier 114 during the second mode of operation. As described above, the measuring component 106 is configured to determine (e.g., measure) a change in mutual-capacitance associated with a touch event during the first mode of operation or determine a change in self-capacitance associated with the touch event during the second mode of operation. In one or more implementations, the control component 125 may cause the issuance of a selection signal based upon, but not limited to: event based switching (e.g., switch mode of operation based upon an event), application based switching (e.g., application software associated with a computing device (e.g., a smart phone, a tablet computer, etc.) that the system 100 is utilized within), or frame rate/scan rate switching (e.g., change a mode of operation when a computing device the system is utilized within changes the frame rate and/or scan rate within the computing device).

As shown in FIG. 4, the offset cancellation module capacitance of the offset cancellation module is adjusted until the value of the offset cancellation capacitance approximately equals the capacitance associated with the drive channel at the node (N1) to at least partially cancel the capacitance associated with the drive channel (Block 404). In one or more implementations, the control module 125 causes the offset cancellation module 202 to adjust the offset capacitance value (e.g., capacitor ($C_{off}$)) until the value of offset cancellation capacitance is at least approximately equal to the capacitance associated with the drive channels of the system 100 at the node (N1) 110. For example, the system 100 may include multiple drive channels coupled to the node (N1) 110. In an implementation, each drive channel may include a touch panel sensor 102 and a sensor driver 104, each drive channel having a mutual capacitance value and environmental capacitances associated with each drive channel (e.g., capacitances associated with the sensor 102 and the sensor driver 104). Thus, the capacitance value of the offset cancellation module 202 may be adjusted until the capacitance value at least partially cancels the capacitance value at the node (N1) 110. In other implementations, the control module 125 may be configured to adjust the offset cancellation module 202 based upon a determination of when the output voltage of the measuring module 106, or the output voltage of the demodulator component 108, corresponds to zero volts (0V), or the smallest negative value (or the smallest positive value when the offset cancellation capacitance of the offset capacitor ($C_{off}$) 210 is adjusted at least approximately to, but not greater than, the capacitance at the node (N1) 110, e.g., capacitance values associated with the drive channels)). For example, when the capacitance value of the offset capacitor ($C_{off}$) 210 becomes greater than the capacitance value at the node (N1) 110, the output voltage may be approximately equal to a negative voltage and the output voltage represents a negative voltage value.

As shown in FIG. 4, the phase ($\phi$) of the offset cancellation signal is adjusted so that the phase ($\phi$) is equal to about one hundred and eighty degrees (180°) of the drive signal to at least partially cancel the drive signal (Block 406). In an implementation, the phase ($\phi$) of the offset cancellation signal may be adjusted so that the phase ($\phi$) is equal to about one hundred and eighty degrees (180°) of the phase of the drive signal, which is generated by the sensor driver 104. Thus, the phase ($\phi$) is adjusted so that the phase ($\phi$) is about equal to one hundred and eighty degrees (180°) of the phase of the drive signal at the output of the offset cancellation driver 204 to at least partially cancel the drive signal. In other implementations, the phase (φ) may be set to other values to provide the maximum offset of the phase of the signal (generated by the sensor driver 104) at the node (N1) 110. For example, the phase (φ) may be set to equal the phase of the drive signal plus or minus one hundred eighty degrees (±180°) at the node (N1) 110. In implementations, the frequency (ω) of the offset cancellation signal is adjusted so that the offset cancellation frequency (ω) at least substantially matches the sensor frequency (ω) of the signal generated by the sensor driver 104.

As shown in FIG. 2, the amplitude (A2) of the offset cancellation signal is adjusted to cause the offset cancellation signal to at least partially cancel the drive signal (e.g., the remaining portion of the drive signal is cancelled due to the offset cancellation signal phase adjustment) (Block 408). In an implementation, the amplitude (A2) of the offset cancellation signal, which is generated by the offset cancellation driver 204, is adjusted so that the offset cancellation signal at least partially cancels the drive signal at the node (N1) 110. The amplitude (A2) may be adjusted based upon the remaining portion of the drive signal not cancelled as a result of adjusting the phase (φ) of the offset cancellation signal (see Block 406). For example, the amplitude (A2) may be adjusted so that the amplitude (A2) is approximately equal to the amplitude (A1) of the drive signal (which is generated by the sensor driver 104). In another example, the amplitude (A2) may be adjusted so that the amplitude (A2) at least partially equals (e.g., amplitude (A2) is equal to about ten percent (10%) of the amplitude (A1), amplitude (A2) is equal to about sixty percent (60%) of the amplitude (A1), and so forth) Thus, the amplitude (A2) values of the offset cancellation signals may vary according to the amount of drive signal cancelled from the phase adjustment discussed above (e.g., phase adjust discussed in block 204). In one or more implementations, the control component 125 utilizes the capacitive value of the offset cancellation component 202 (e.g., capacitance value of capacitor ($C_{off}$) 210, and so forth) and the phase (φ) of the offset cancellation signal to adjust the offset cancellation amplitude (A2) to reduce the output voltage of the measuring component 106 and/or the output voltage of the ADC 110. For example, the amplitude (A2) of the offset cancellation signal may be adjusted until the output voltage of the measuring component 106 and/or the output voltage of the ADC 110 is at least approximately zero volts (0V).

As shown in FIG. 4, a change in capacitance due to a touch event performed over a touch panel is measured at a measuring component (Block 410). The offset cancellation of the environmental capacitances within the system 100 can be optimized so that the touch capacitance is detected/measured by the measuring component 106. As described above, the adjustment of the touch panel sensor system 100 provides an increased dynamic range. For example, at least partially all of the non-touch capacitive values (e.g., environmental capacitive values) experienced by the sensors 114 may be cancelled from the measurement by the various adjustments of the offset cancellation signal, which may allow the measuring component 106 to employ a smaller integrating capacitor (e.g., capacitance ($C_{int}$) 116), which enables the system 100 to be responsive to lower capacitances/voltages. In an implementation, at least substantially (e.g., a majority part of) all of the non-touch capacitive values (e.g., environmental capacitive values) experienced by the columns and rows may be cancelled from the measurement by the various adjustments of the offset cancellation signal. Thus, the resolution and/or dynamic range of the touch panel sensor system 100 may be improved. Specifically, the touch panel sensor system 100 may have improved dynamic range due to the system 100 dynamically adjusting (e.g., via control component 125) an offset cancellation component 202 to modify capacitive values, signal amplitude values, and signal phase values to offset environmental (e.g., parasitic) and static sensor capacitances of the sensor 102. Once the environmental and static sensor capacitances are reduced, the measuring component 106 is configured to detect/measure the mutual-capacitance associated with a touch event during a first mode of operation. Additionally, the measuring component 106 is configured to detect/measure the self-capacitance associated with the touch event during a second mode of operation. As a result, the capacitance-to-voltage converter of the touch panel sensor system 100 may utilize a small integrating capacitor thereby lowering cost and improving the dynamic range and signal to noise ratio of the system 100. Additionally, the use of dedicated drivers (the sensor driver and the offset cancellation driver), arbitrary signals may be utilized to drive the respective components while maintaining efficient sensor capacitance cancelling capabilities. Additionally, noise margins (e.g., noise headroom) may be maximized to enable a better signal to noise ratio.

Conclusion

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A system comprising:
   a sensor comprising a plurality of row electrodes and a plurality of column electrodes crossing the row electrodes, the sensor configured to detect a change in capacitance associated with a touch event upon a touch panel;
   a measuring component comprising a plurality of integrators each having a first input, a second input and an output, the first input being coupled to a corresponding one of the row electrodes, the measuring component configured to detect mutual-capacitance associated with the sensor during a first mode of operation and to detect self-capacitance associated with the sensor during a second mode of operation;
   a selection component comprising a first input, a second input coupled to a ground, a first output coupled to at least one of the column electrodes, and a second output coupled to the second input of at least one of the integrators, the selection component configured to receive a selection signal to cause selection of at least the first mode of operation or the second mode of operation; and
   a driver component coupled to the first input of the selection component, the driver component configured to generate a time-varying drive signal, the time-varying drive signal furnished to the sensor by way of the selection component, the time-varying drive signal having a first amplitude characteristic during the first mode of operation and a second amplitude characteristic different from the first amplitude characteristic during the second mode of operation, a magnitude of the difference between the first amplitude characteristic and the second amplitude characteristic being proportional to a difference between a change in mutual-capacitance associated with a touch event while in the first mode of operation and a change in self-capacitance associated with a touch event while in the second mode of operation.

2. The system as recited in claim 1, wherein each integrator of the plurality of integrators includes a charge amplifier having an integrating capacitor disposed between an inverting terminal and an output of the charge amplifier, wherein the charge amplifier outputs a signal having an amplitude characteristic that is proportional to a change in mutual-capacitance associated with the touch event during the first mode of operation and outputs a signal having an amplitude characteristic that is proportional to a change in self-capacitance associated with the touch event during the second mode of operation.

3. The system as recited in claim 1, wherein the driver component comprises a digital-to-analog converter coupled to a buffer, the buffer coupled to the sensor.

4. The system as recited in claim 1, further comprising a demodulator component coupled to the measuring component, the demodulator component configured to demodulate an analog signal furnished by the measuring component, the analog signal representing a change in mutual-capacitance corresponding to the touch event during the first mode of operation and representing a change in self-capacitance corresponding to the touch event during the second mode of operation.

5. The system as recited in claim 4, wherein the demodulator component comprises an analog-to-digital converter.

6. The system as recited in claim 1, wherein the sensor comprises a plurality of driving lines and a plurality of sensing lines across the plurality of driving lines, the plurality of driving lines and the plurality of sensing lines defining a coordinate system where each coordinate location comprises a capacitor.

7. The system as recited in claim 1, further comprising a control component coupled to the selection component, the control component configured to cause issuance of the selection signal to the selection component to cause selection of at least one of the first mode of operation or the second mode of operation.

8. The system as recited in claim 1, wherein the second amplitude characteristic is at least approximately ten times smaller than the first amplitude characteristic.

9. The system as recited in claim 7, wherein the control component generates the selection signal based on an event.

10. The system as recited in claim 7, wherein the control component generates the selection signal based on an application.

11. The system as recited in claim 7, wherein the control component generates the selection signal based on a change in frame rate or scan rate.

12. A touch panel system comprising:
sensor circuitry including a plurality of row electrodes and a plurality of column electrodes crossing the row electrodes;
driver circuitry configured to generate a time-varying drive signal;
control circuitry configured to generate a selection signal;
a measurement system including a plurality of row integrators each having a first input, a second input and an output, the first input being electrically coupled with a corresponding one of the row electrodes to detect a change in capacitance; and
selection circuitry including: a first input electrically coupled with the driver circuitry to receive the drive signal, a second input electrically coupled with a ground, a first output electrically coupled with at least one of the column electrodes, and a second output electrically coupled with the second input of at least one of the row integrators, the selection circuitry configurable responsive to the selection signal:
for a first mode of operation, to provide the drive signal to the at least one column electrode, and ground the second input of the at least one row integrator; and
for a second mode of operation, to ground the at least one column electrode, and provide the drive signal to the second input of the at least one row integrator.

13. The touch panel system of claim 12, the first mode of operation being a mutual-capacitance sensing mode of operation, and the second mode of operation being a self-capacitance sensing mode of operation.

14. The touch panel system of claim 12, the driver circuitry being further configured to scale the drive signal based on the selection signal.

15. The touch panel system of claim 14, the driver circuitry being configured to scale the drive signal such that the drive signal has a first amplitude while in the first mode of operation and a second amplitude different than the first amplitude while in the second mode of operation, a scaling factor between the first amplitude and the second amplitude being proportional to a difference between a change in capacitance associated with a touch event while in the first mode of operation and a change in capacitance associated with a touch event while in the second mode of operation.

16. The touch panel system of claim 12, the selection circuitry including a first selection circuit including:
a first multiplexer configured to:
output the drive signal to the first output of the selection circuitry while in the first mode of operation,
ground the first output of the selection circuitry while in the second mode of operation; and
a second multiplexer configured to:
ground the second output of the selection circuitry while in the first mode of operation, and
output the drive signal to the second output of the selection circuitry while in the second mode of operation.

17. The touch panel system of claim 12, the measurement system further including a plurality of column integrators each having a first input, a second input and an output, the first input being electrically coupled with a corresponding one of the column electrodes.

18. The touch panel system of claim 17, the selection circuitry further including:
a third output electrically coupled with at least one row electrode of the plurality of row electrodes; and
a fourth output electrically coupled with the second input of at least one column integrator.

19. The touch panel system of claim 18, the selection circuitry further including a second selection circuit including:
a first multiplexer configured to:
ground the third output of the selection circuitry while in the second mode of operation, and
output the drive signal to the fourth output of the selection circuitry while in the first mode of operation; and
a second multiplexer configured to:

output the drive signal to the fourth output of the selection circuitry while in the second mode of operation, and ground the third output of the selection circuitry while in the first mode of operation.

\* \* \* \* \*